(12) United States Patent
Mizrahi

(10) Patent No.: US 10,697,849 B2
(45) Date of Patent: Jun. 30, 2020

(54) FLEX DUCT ADAPTER WITH QUICK CONNECT FLANGE FOR DUCT TESTER

(71) Applicant: Shalom Mizrahi, Fairfield, CT (US)

(72) Inventor: Shalom Mizrahi, Fairfield, CT (US)

(*) Notice: Subject to any disclaimer, the term of this patent is extended or adjusted under 35 U.S.C. 154(b) by 229 days.

(21) Appl. No.: 15/996,687

(22) Filed: Jun. 4, 2018

(65) Prior Publication Data

US 2019/0368966 A1 Dec. 5, 2019

(51) Int. Cl.
*G01M 3/28* (2006.01)

(52) U.S. Cl.
CPC .................................. *G01M 3/2846* (2013.01)

(58) Field of Classification Search
CPC ........ G01M 3/26; G01M 3/28; G01M 3/2846; F24F 13/084
USPC .................................................. 73/40, 40.5 R
See application file for complete search history.

(56) References Cited

U.S. PATENT DOCUMENTS

| | | | |
|---|---|---|---|
| 4,520,715 A | 6/1985 | Coomes | |
| 6,439,061 B1 | 8/2002 | Nelson | |
| 7,992,903 B1 | 8/2011 | Desimone | |
| 8,757,008 B1 | 6/2014 | Nelson | |
| 9,360,230 B2 | 6/2016 | Breed | |
| 2002/0069599 A1 | 6/2002 | Dhallan | |
| 2005/0204664 A1 | 9/2005 | Snyder | |
| 2009/0302544 A1* | 12/2009 | Pugh, Jr. | F16J 15/122 277/312 |
| 2013/0331023 A1* | 12/2013 | Yalmeh | F24F 13/1426 454/275 |
| 2014/0213173 A1* | 7/2014 | Breed | F24F 13/20 454/333 |
| 2014/0315481 A1 | 10/2014 | Breed | |
| 2016/0377311 A1* | 12/2016 | Breed | F24F 13/082 454/333 |

\* cited by examiner

*Primary Examiner* — Benjamin R Schmitt
(74) *Attorney, Agent, or Firm* — Michael A. Blake

(57) ABSTRACT

A register adapter comprising: a flange adapter, the flange adapter comprising: a flange, the flange being a generally planar surface configured to abut a register grill when the flange adapter is attached to the register grill, the flange having a generally circular opening; a cylindrical portion extending from the flange a flex duct connector having a generally cylindrical shape and configured to attach to the cylindrical portion, the flex duct connector also configured to attach to a length of flex duct; where air flow is configured to travel in either direction from the flex duct through the interior of the flex duct connector, through the interior of the cylindrical portion, through the circular opening and into the register grill.

13 Claims, 4 Drawing Sheets

FLEX DUCT ADAPTER WITH QUICK CONNECT FLANGE FOR DUCT TESTER

TECHNICAL FIELD

The present invention relates to the field of removable air duct sealing systems for obstructing or directing airflow through portions of an air duct system.

BACKGROUND

As the trend to conserve energy continues, more individuals are demanding and more governmental entities are mandating that houses and commercial facilities undergo periodic energy audits. An energy audit is a service where a building structure's energy efficiency is evaluated by a person using professional equipment with the aim to suggest the best ways to improve energy efficiency in heating and cooling the structure.

An energy audit may involve recording various characteristics of the building envelope including the walls, ceilings, floors, doors, windows, and skylights. For each of these components the area and resistance to heat flow (R-value) is measured or estimated. The leakage rate or infiltration of air through the building envelope is of concern and is strongly affected by window construction and quality of door seals such as weather stripping. The goal of an audit is to quantify the building's overall thermal performance. The audit may also assess the efficiency, physical condition, and programming of mechanical systems such as the heating, ventilation, air conditioning (HVAC) equipment, and thermostat.

Leaks in an air duct system often account for a large percentage of energy being wasted in a typical home. In a residence, the percentage of air that escapes out of an air duct system due to leaks, on average, is approximately twenty-five percent (25%). Given that in some areas of the country, sixty percent (60%) to seventy percent (70%) of the cost of a household's monthly utilities bill is due to the operation of the HVAC system, air leakage in an air duct system may represent a significant waste of both monetary and energy resources.

Measuring the leakage in an air duct system is generally the most time consuming portion of a home energy audit. In fact, as much as fifty percent (50%) of the time required to perform a home energy audit is consumed in testing air leakage of an air duct system. The majority of that time is spent sealing off the various air vents so that the air duct system can be pressurized or depressurized to measure the air leaks. Many audits of a building's HVAC system occur while the building is still under construction.

Current methods of sealing off the air vents involve the use of a special adhesive tape that adheres to the face of an air vent. In addition, When testing ductwork for air leaks, an air flow measurement system designed to test and document the airtightness of forced air duct systems in both houses and light commercial buildings is used. Generally, one end of a flex duct is connected to the air flow measurement system and on the other end of the flex duct is connected to a flange. The flange is then taped with a grill mask tape to a grill register of the duct system, to air seal and to hold the flex duct in communication between the grill register and the air flow measurement system. Due to the weight of the flex duct and the flange, over the time of the testing, the grill mask tape starts to loosen from the grill register. When this happens it will show more air leaks then actually exist in the duct system which then becomes a false reading. Also, the flex duct is generally permanently attached between the grill register and the air flow measurement system, thus causing a hindrance to workers who may be still constructing the building, or doing other work in the building.

Occasionally, the register grill needs to be removed to provide access in order to air seal the duct boot of the system properly. This usually requires two technicians, one to hold the register and the flex duct and the other to disconnect the grill register. If there is only one technician, then the technician can disconnect the flex duct from the grill register by removing the grill mask and then putting the flex duct down to then remove the grill register. This process wastes time and money!

Thus there is a need for a register adapter that overcomes the above listed and other disadvantages.

SUMMARY OF THE INVENTION

The disclosed invention relates to a register adapter comprising: a flange adapter, flange adapter comprising: a flange, the flange being a generally planar surface configured to abut a register grill when the flange adapter is attached to the register grill, the flange having a generally circular opening; a cylindrical portion extending from the flange, the cylindrical portion generally aligned with the circular opening; a support member attached to the interior of the cylindrical portion; an attachment means located on the support member, the attachment means configured to removably attach to the register grill, holding the flange adapter in place on the register grill; a first radial flange extending from the outer surface of the cylindrical portion; a second radial flange extending from the outer surface of the cylindrical portion; a flex duct connector having a generally cylindrical shape and configured to attach to the cylindrical portion, the flex duct connector also configured to attach to a length of flex duct; a friction surface attached to the outer surface of the flex duct connector; an inner flange located on the inner surface of the flex duct connector; a latch located on the flex duct connector, the latch configured to attach to the first radial flange, thereby connecting the flex duct connector to the flange adapter; a generally circular gasket configured to abut against the second radial flange and the inner flange, thereby creating a generally airtight seal; and a webbing tie configured to attach a flex duct to the friction surface and the outer surface of the flex duct connector; where air flow is configured to travel in either direction from the flex duct through the interior of the flex duct connector, through the interior of the cylindrical portion, through the circular opening and into the register grill.

In addition, the invention relates to a register adapter system comprising: a flange adapter attachable to a register grill, the flange adapter comprising: a flange, the flange being a generally planar surface configured to abut the register grill when the flange adapter is attached to the register grill, the flange having a generally circular opening; a cylindrical portion extending from the flange, the cylindrical portion generally aligned with the circular opening; a support member attached to the interior of the cylindrical portion; an attachment means located on the support member, the attachment means configured to removably attach to the register grill, holding the flange adapter in place on the register grill; a first radial flange extending from the outer surface of the cylindrical portion; a second radial flange extending from the outer surface of the cylindrical portion; a flex duct connector having a generally cylindrical shape and configured to attach to the cylindrical portion; a length of flex duct configured to attach to the flex duct connector; an inner flange located on the inner surface of the flex duct connector; a friction surface attached to the outer surface of the flex duct connector; a latch located on the flex duct connector, the latch configured to attach to the first radial flange, thereby connecting the flex duct connector to the flange adapter; a generally circular gasket configured to abut against the second radial flange and the inner flange, thereby creating a generally airtight seal; and a webbing tie configured to attach the flex duct to the friction surface and the outer surface of the flex duct connector; an air flow measurement system, the air flow measurement system comprising a fan, the fan in fluid communication with the flex duct; where air flow is configured to travel in either direction from the fan through the flex duct, through the interior of the flex duct connector, through the interior of the cylindrical portion, through the circular opening and into the register grill.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION OF THE INVENTION

Figure 1:
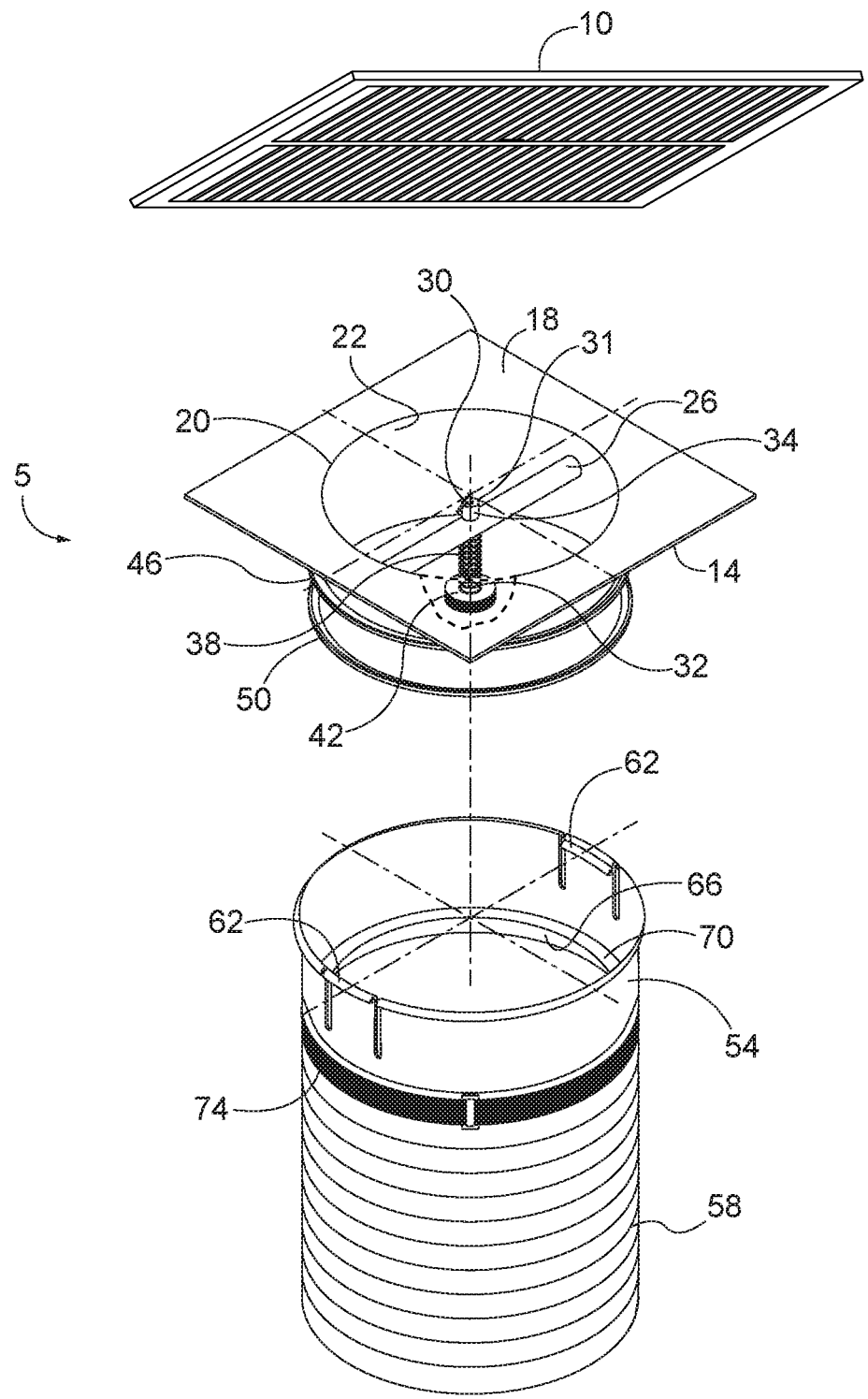
FIG. 1 is an exploded view of the register adapter apparatus.

FIG. 1 shows an exploded view of the components of the register adapter system 5. A register grill 10 is shown. The register grill 10 is a register grill that is part of the building's HVAC system, and is in communication with ductwork in the building. A flange adapter 14 is removably attachable to the register grill 10. The flange adapter 14 comprises a flange 18, a generally planar surface that abuts the register grill 10 when the flange adapter 14 is attached to the register grill 10. The flange adapter 14 comprises a cylindrical portion 22. The flange 18 has a generally cylindrical opening 20 that is aligned with the cylindrical portion 22. A support member 26 is attached to the interior of the cylindrical portion 22. A spring loaded hook 30 is supported by the support member 26. The spring loaded hook 30 extends through a spacer 34, the support member 26, a spring 38, and is attached to a knob 42. The spring loaded hook 30 may have a hook end 31, and an end 32 opposite the hook end 31. The knob 42 may be located at the end 32 opposite the hook end 31. The spring 38 forces the knob 42 away from the support member 26. When a user pushes the knob 42 in, the hook 30 and hook end 31 extends from the support member 26, allowing the user to make the hook 30 attach to the register grill 10. The spring loaded hook 30 is only one type of register attachment means encompassed by this application, any other suitable attachment means including a plurality of hooks, grill mask tape, hook and loop, etc. are also included in this disclosure.

The outer surface of the cylindrical portion comprises a first radial flange 46, and a second radial flange 50. A flex duct connector 54 is attached to a flex duct 58. The flex duct connector 54 is removably attachable to the cylindrical portion 22. The flex duct connector 54 is configured to slide over the cylindrical portion 22 and attach to the first radial flange 46 via both latches 62 on the inner surface of the flex duct connector 54. In other embodiments, there may only be one latch 62, or more than two latches 62. The flex duct connector 54 may have a generally cylindrical shape. A radial flange 66 located on the inner surface of the flex duct connector 54 supports a gasket 70. When the latches 62 are connected to the first radial flange 46, the gasket 70 abuts the second radial flange 50, thereby creating a seal for the air inside the flex duct traveling to or from the register grill 10. The gasket 70 may have a generally circular or cylindrical shape. A webbing tie 74 is located on the outer surface of the flex duct and connects the flex duct to the flex duct connector 54. In one embodiment, the flex duct may slide over the outside of the flex duct connector 54, and the webbing tie 74 goes around the flex duct and flex duct connector 54, and once tightened, the webbing tie 74 holds the flex duct to the flex duct connector 54.

Figure 2:
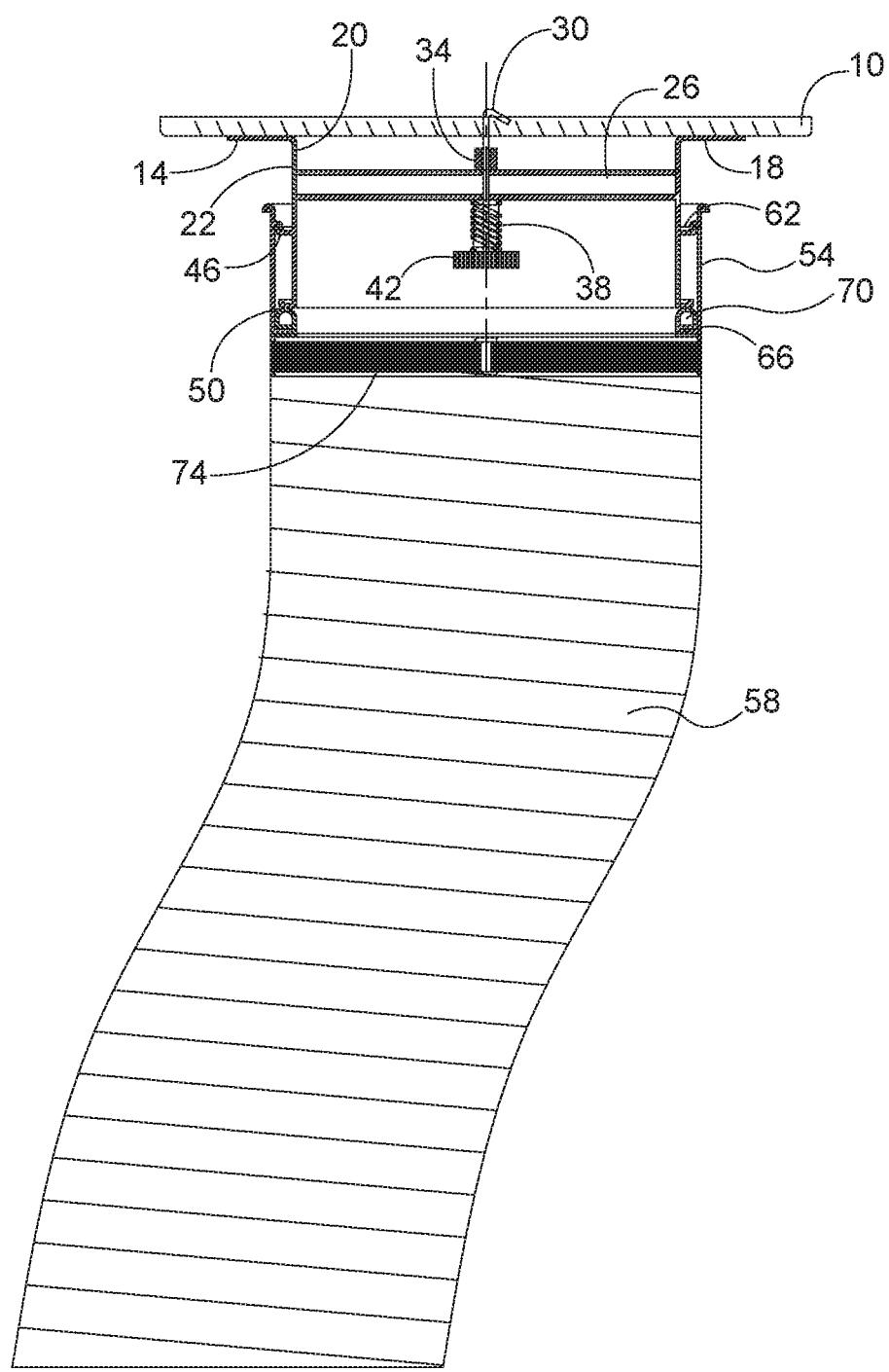
FIG. 2 is a cross-sectional view of the register adapter apparatus.

FIG. 2 is a cross-sectional view of the flex duct connector 54 connected to the register grill 10 via the flange adapter 14.

Figure 3:
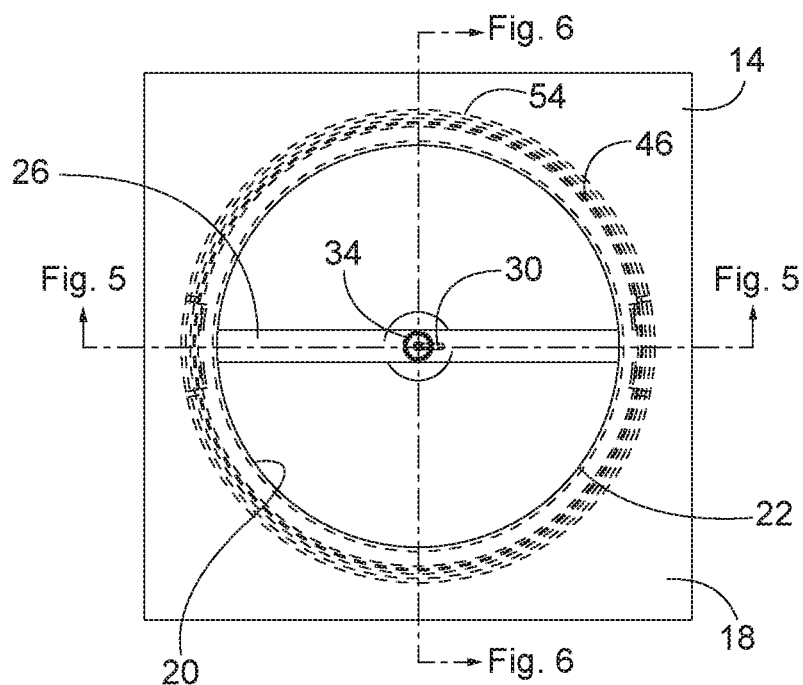
FIG. 3 is top view of the register adapter apparatus.

FIG. 3 is a top view of the flange adapter 14 attached to the flex duct connector 54. The cylindrical portion 22 is shown in solid line and an outer dashed line. The first radial flange 46, and flex duct connector 54 are shown dashed lines.

Figure 4:
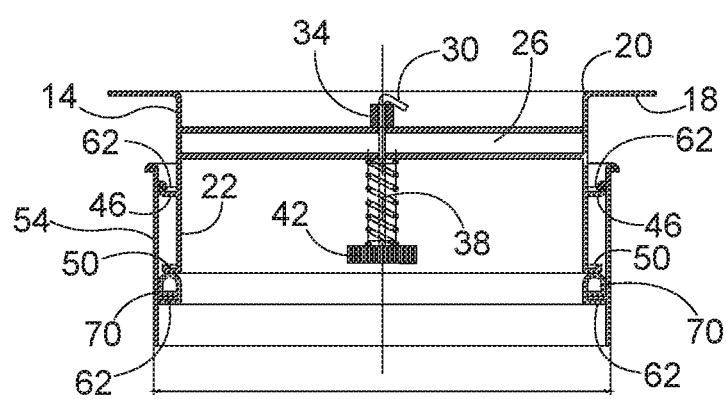
FIG. 4 is cross-sectional view of the register adapter apparatus.

FIG. 4 is a cross-section view of the flange adapter 14 attached to the flex duct connector 54 from FIG. 3.

Figure 5:
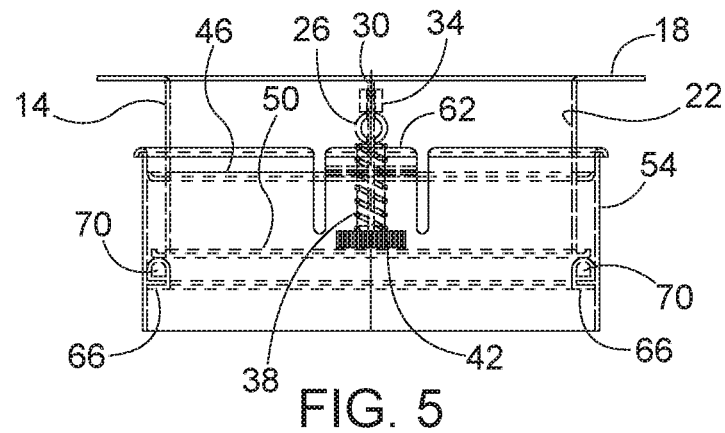
FIG. 5 is another cross-sectional view of the register adapter apparatus.

FIG. 5 is another cross-section view of the flange adapter 14 attached to the flex duct connector 54 from FIG. 3.

Figure 6:
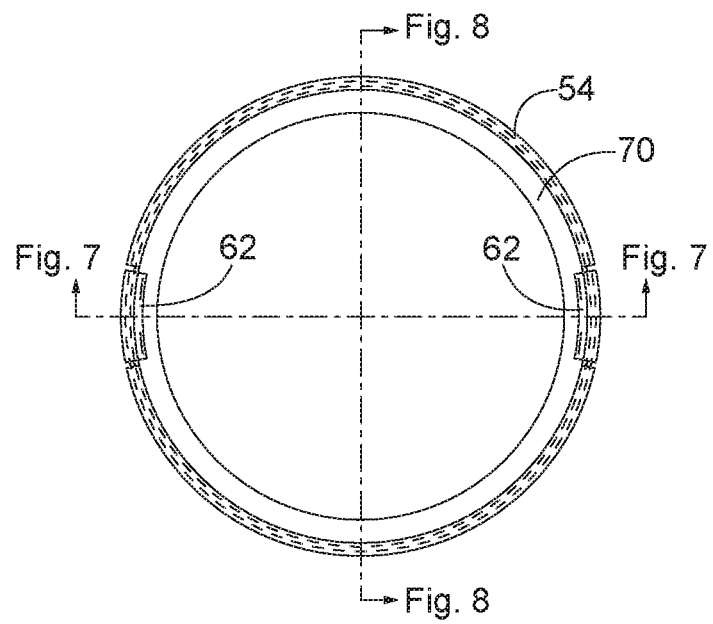
FIG. 6 is a top view of the flex duct connector.

FIG. 6 is a top view of the flex duct connector 54.

Figure 7:
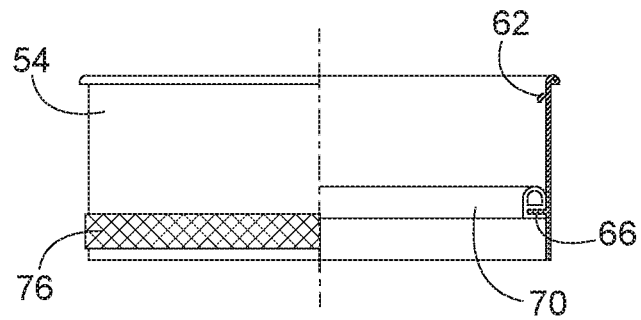
FIG. 7 is a partial-cross-sectional view of the flex duct connector.

FIG. 7 is a partial cross-sectional view of the flex duct connector 54 from FIG. 6. A friction surface is attached to the outside surface of the flex duct connector 54 to prevent from the flex duct 58 from slipping off the flex duct connector 54 when the webbing tie 74 is tightened against the flex duct 58, friction surface, and flex duct connector 54. The friction surface 76 may be attached via an adhesive, such as glue or any other suitable adhesive. The friction surface may be friction tape, or a hook and loop strap.

Figure 8:
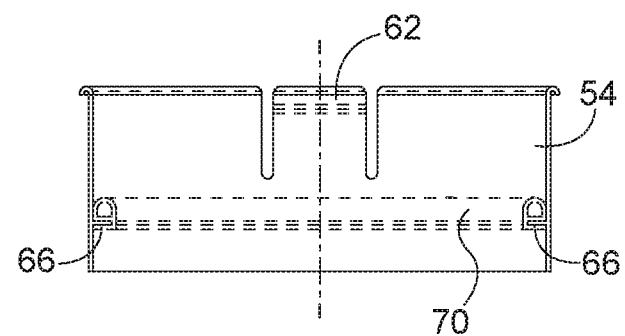
FIG. 8 is another cross-sectional view of the flex duct connector.

FIG. 8 is another cross-sectional view of the interior of the flex duct connector 54 from FIG. 6. In this view, the gasket 70 is transparent to show detail.

The register adapter system 5 comprises a flange adapter 14, with a single hook 30 located at the center of the cylindrical portion 22. Because of this single hook 30 configuration, the flange adapter can be easily attached to any and all size register grills. Quick release latches 62 allows one to quickly remove the flex duct connector 54 and flex duct from the flange adapter 14, thereby allowing a user to move the flex duct out of the way of workers and the resident of the home. The hook 30 secures the flange 18 in place to the register grill so the flange 18 is no longer a structural support but only needed to keep the system air tight. This will eliminate false air leak measurements. For a safe working environment (i.e. removing the tripping hazard of the flex duct) and equipment protection this invention has quick connect/release collar latches that easily connects the flex duct connector 54 and flex duct 58 to the flange adapter 14. After the air leak testing is done, to keep the area safe and so people do not trip over the flex duct 58, users are easily able to remove the flex duct 58 from the working area by unhooking the latches, and moving the flex duct connector 54 and flex duct 58 from the flange adapter 14 without removing the flange 18 and the grill mask tape and store it in a safe area so users can then work and move around in a safer environment. Once finished with any necessary duct sealing users are easily able to reconnect the flex duct 58 and flex duct connector 54 to the flange adapter 14 and retest the system.

Occasionally, the register grill 10 needs to be removed to provide access in order to air seal the duct boot of the system properly. In some embodiments, the duct boot is the end piece that is connected to the duct and attaches to the floor or ceiling and it is covered by the grill register. With the disclosed register adapter system 5 only one person is required to disconnect the flex duct connector 54 and flex duct 58 from the flange adapter 14 with the quick release latches 62, and then easily remove the register grill 10 without removing the grill mask tape or flange adapter 14.

This invention has many advantages. The register adapter system has only one hook in the center of the cylindrical portion 22 that holds the flange adapter 14 to the register grill 10. This allows a technician to easily use it with any/all size registers. This invention also creates a safer working environment by being able to easily remove the flex duct out of the way, after air leak testing and before duct sealing, by using the quick connect/release latches and moving the flex duct out of the area. By not having to remove the grill mask tape and the flange (for a safer working environment), one saves time and money.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A register adapter comprising:
   a flange adapter, the flange adapter comprising:
   a flange, the flange being a generally planar surface configured to abut a register grill when the flange adapter is attached to the register grill, the flange having a generally circular opening;
   a cylindrical portion extending from the flange, the cylindrical portion generally aligned with the circular opening;
   a support member attached to the interior of the cylindrical portion;
   an attachment means located on the support member, the attachment means configured to removably attach to the register grill, holding the flange adapter in place on the register grill;
   a first radial flange extending from the outer surface of the cylindrical portion;
   a second radial flange extending from the outer surface of the cylindrical portion;
   a flex duct connector having a generally cylindrical shape and configured to attach to the cylindrical portion, the flex duct connector also configured to attach to a length of flex duct;
   a friction surface attached to the outer surface of the flex duct connector;
   an inner flange located on the inner surface of the flex duct connector;
   a latch located on the flex duct connector, the latch configured to attach to the first radial flange, thereby connecting the flex duct connector to the flange adapter;
   a generally circular gasket configured to abut against the second radial flange and the inner flange, thereby creating a generally airtight seal; and
   a webbing tie configured to attach a flex duct to the friction surface and the outer surface of the flex duct connector;
   wherein air flow is configured to travel in either direction from the flex duct through the interior of the flex duct connector, through the interior of the cylindrical portion, through the circular opening and into the register grill.

2. The register adapter of claim 1, wherein the attachment means comprises:
   a spring loaded hook attached to the support member;
   a space located between the support member and the hook end of the spring loaded hook;
   a knob attached to the hook on an end opposite the hook end.

3. The register adapter of claim 1, further comprising:
   a second latch located on the flex duct connector, the latch configured to attach to the first radial flange, thereby connecting the flex duct connector to the flange adapter.

4. The register adapter of claim 1, wherein the length of flex duct is configured to attach to a fan for an air flow measurement system.

5. The register adapter of claim 1, wherein the flange is smaller than the register grill.

6. The register adapter of claim 1, wherein the flange is larger than the register grill.

7. The register adapter of claim 1, wherein the flange is about the same size and shape as the register grill.

8. A register adapter system comprising:
   a flange adapter attachable to a register grill, the flange adapter comprising:
   a flange, the flange being a generally planar surface configured to abut the register grill when the flange adapter is attached to the register grill, the flange having a generally circular opening;
   a cylindrical portion extending from the flange, the cylindrical portion generally aligned with the circular opening;
   a support member attached to the interior of the cylindrical portion;
   an attachment means located on the support member, the attachment means configured to removably attach to the register grill, holding the flange adapter in place on the register grill;
   a first radial flange extending from the outer surface of the cylindrical portion;
   a second radial flange extending from the outer surface of the cylindrical portion;
   a flex duct connector having a generally cylindrical shape and configured to attach to the cylindrical portion;
   a length of flex duct configured to attach to the flex duct connector;

an inner flange located on the inner surface of the flex duct connector;
a friction surface attached to the outer surface of the flex duct connector;
a latch located on the flex duct connector, the latch configured to attach to the first radial flange, thereby connecting the flex duct connector to the flange adapter;
a generally circular gasket configured to abut against the second radial flange and the inner flange, thereby creating a generally airtight seal; and
a webbing tie configured to attach the flex duct to the friction surface and the outer surface of the flex duct connector;
an air flow measurement system, the air flow measurement system comprising a fan, the fan in fluid communication with the flex duct;
wherein air flow is configured to travel in either direction from the fan through the flex duct, through the interior of the flex duct connector, through the interior of the cylindrical portion, through the circular opening and into the register grill.

9. The register adapter system of claim 8, wherein the attachment means comprises:
a spring loaded hook attached to the support member;
a space located between the support member and the hook end of the spring loaded hook;
a knob attached to the hook on an end opposite the hook end.

10. The register adapter system of claim 8, further comprising:
a second latch located on the flex duct connector, the latch configured to attach to the first radial flange, thereby connecting the flex duct connector to the flange adapter.

11. The register adapter system of claim 8, wherein the flange is smaller than the register grill.

12. The register adapter system of claim 8, wherein the flange is larger than the register grill.

13. The register adapter system of claim 8, wherein the flange is about the same size and shape as the register grill.

* * * * *